US010625204B2

(12) United States Patent
Lubomirsky et al.

(10) Patent No.: US 10,625,204 B2
(45) Date of Patent: Apr. 21, 2020

(54) METHOD FOR FLUE GAS DESULFURIZATION WITH MOLTEN CARBONATE

(71) Applicant: YEDA RESEARCH AND DEVELOPMENT CO. LTD., Rehovot (IL)

(72) Inventors: Igor Lubomirsky, Petach-Tikva (IL); Valery Kaplan, Rehovot (IL); Nurlan Dosmukhamedov, Rehovot (IL)

(73) Assignee: YEDA RESEARCH AND DEVELOPMENT CO. LTD., Rehovot (IL)

( * ) Notice: Subject to any disclaimer, the term of this patent is extended or adjusted under 35 U.S.C. 154(b) by 0 days.

(21) Appl. No.: 16/311,174

(22) PCT Filed: Jun. 19, 2017

(86) PCT No.: PCT/IL2017/050677
§ 371 (c)(1),
(2) Date: Dec. 19, 2018

(87) PCT Pub. No.: WO2017/221238
PCT Pub. Date: Dec. 28, 2017

(65) Prior Publication Data
US 2019/0321776 A1    Oct. 24, 2019

(30) Foreign Application Priority Data

Jun. 19, 2016 (IL) .......................................... 246429

(51) Int. Cl.
*B01D 53/50* (2006.01)
*B01D 53/78* (2006.01)
*B01D 53/96* (2006.01)

(52) U.S. Cl.
CPC ........... *B01D 53/507* (2013.01); *B01D 53/78* (2013.01); *B01D 53/96* (2013.01); *B01D 2251/11* (2013.01); *B01D 2251/208* (2013.01); *B01D 2251/302* (2013.01); *B01D 2251/304* (2013.01); *B01D 2251/306* (2013.01); *B01D 2251/606* (2013.01); *B01D 2257/302* (2013.01)

(58) Field of Classification Search
CPC .. B01D 53/1481; B01D 53/50; B01D 53/501; B01D 53/502; B01D 53/507; B01D 53/508; B01D 2251/606; B01D 2257/302; B01D 2258/0283
See application file for complete search history.

(56) References Cited

U.S. PATENT DOCUMENTS 3,438,728 A * 4/1969 Grantham ............... B01D 53/34
                                                           423/563
3,524,720 A * 8/1970 Bauer ..................... B01D 53/04
                                                         423/244.08
3,574,543 A    4/1971 Heredy
3,850,742 A   11/1974 Dugan et al.
3,867,514 A    2/1975 Moore
4,081,522 A *  3/1978 Hubble ................. B01D 53/501
                                                         423/170
8,852,540 B2  10/2014 Lubomirsky et al.
2014/0154158 A1  6/2014 Lubomirsky et al.

FOREIGN PATENT DOCUMENTS

EP         2723473 B1 *  1/2016  ......... B01D 53/1481
GB    1 360 09707-       7/1974
            17-1974
GB         1360097 A  *  7/1974  ........... C01B 17/164
PL         2644267 T3 *  4/2018  ............ B01J 20/041

OTHER PUBLICATIONS

Ashar et al. "A practical guide to the manufacture of sulfuric acid, oleurns, and sulfonating agents" Mumbai, India:: Springer; Nov. 23, 2013.
Crundwell et al. "Extractive metallurgy of nickel, cobalt and platinum group metals" Elsevier; Oct. 7, 2011, p. 583.
Davenport et al. "Extractive metallurgy of copper" Elsevier; Sep. 19, 2002, p. 417.
Dosmukhamedov et al. "Natural gas regeneration of carbonate melts following SO 2 capture from non-ferrous smelter emissions" RSC Advances. 2017;7(35):21406-11.
Dudka et al. "Environmental impacts of metal ore mining and processing: a review" Journal of environmental quality. 1997;26(3):590-602.
Habashi F. "Copper metallurgy at the crossroads" Journal of Mining and Metallurgy B: Metallurgy. 2007;43(1):1-19.
International Search Report for PCT Application No. dated Sep. 18, 2017.
Kaplan et al. "Carbonate melt regeneration for efficient capture of SO 2 from coal combustion" RSC Advances. 2013;3(36):15842-9.
Kaplan et al. "Conditions of stability for (Li2CO3+ Li2O) melts in air" The Journal of Chemical Thermodynamics. Nov. 1, 2011;43(11):1623-7.
Kawase et al. "Removal of H2S using molten carbonate at high temperature" Waste management. Dec. 1, 2013;33(12):2706-12.
Krebs et al. "Reactive collisions of sulfur dioxide with molten carbonates" Proceedings of the National Academy of Sciences. Apr. 13, 2010;107(15):6622-7.
McIlroy et al. "Absorption of sulfur dioxide by molten carbonates" Environmental science & technology. Nov. 1, 1973;7(11):1022.
Nolan Ps. "Flue gas desulfurization technologies for coal-fired power plants" In Coal-tech 2000 international conference Nov. 13, 2000 (pp. 13-14).
Paniccia et al. "interaction of inert gases with ionic melts. Solubility of He, Ar, N 2, O 2 and CH 4 in the (Na, K) NO 3 eutectic solvent" Journal of the Chemical Society, Faraday Transactions 1: Physical Chemistry in Condensed Phases. 1972;68:2083-9.
Sajwan et al., editors "Coal combustion byproducts and environmental issues" New York: Springer; Jan. 11, 2006.
Schlesinger et al. "Extractive metallurgy of copper" Elsevier; Jul. 26, 2011.
Sinclair RJ "The extractive metallurgy of lead" Australasian Institute of Mining and Metallurgy. Spectrum series. 2009(15), p. 311.
Yosim et al. "Chemistry of the molten carbonate process for sulfur oxides removal from stack gases" Adv. Chem. Ser.;(United States). Jan. 1, 1973;127 (174-182).
Sinclair RJ :The extractive metallurgy of zinc: Victoria: Australasian Institute of Mining and Metallurgy. 2009, p. 303.

* cited by examiner

*Primary Examiner* — Timothy C Vanoy
(74) *Attorney, Agent, or Firm* — Mark S. Cohen; Pearl Cohen Zedek Latzer Baratz LLP

(57) ABSTRACT

This invention is directed to a method used to remove gases from industrial exhaust streams, and in particular, to a method for removing sulfur dioxide from flue gases, with molten carbonate and treating the resulting molten mixture with a natural gas and optionally with an oxidant.

19 Claims, 8 Drawing Sheets

METHOD FOR FLUE GAS DESULFURIZATION WITH MOLTEN CARBONATE

CROSS-REFERENCE TO RELATED APPLICATIONS

This application is a National Phase Application of PCT International Application No. PCT/IL2017/050677, International Filing Date Jun. 19, 2017, claiming priority of IL Patent Application No. 246429, filed Jun. 19, 2016, which are all hereby incorporated by reference.

FIELD OF THE INVENTION

This invention is directed to an apparatus and methods used to remove gases from industrial exhaust streams, and in particular, to an apparatus and methods for removing sulfur dioxide from flue gases.

BACKGROUND OF THE INVENTION

One of the today's main environmental pollution problem is an acidic emissions of sulfur-containing components from coal power plants and from metallurgical smelting plants. In the extraction of metals from ores or in the combustion of fuels, sulfur dioxide is often one of the products of the process and appears in the waste gases normally vented to the atmosphere. Accordingly, the pollution of the atmosphere by sulfur dioxide is one of the greatest air pollution problems facing mankind today. As oil resources dwindle and a chain of nuclear plant disasters casts doubt on their safety, burning of sulfur-containing fuel (coal, natural gas and peat) is expected to increase.

U.S. Pat. No. 8,852,540 describes a continuous method and apparatus for flue gas desulfurization using molten carbonate melt. The process comprises chemical or electrochemical regeneration of a carbonate melt by producing a sulfur-containing vapor from the molten mixture of carbonates, sulfites and sulfates using CO as a reducing agent; releasing said sulfur-containing vapor which can be further converted into liquid and solid phase materials and collected for further use.

Processing and clearing of flue gas from modern smelting units, gas that is relatively rich in sulfur (more than 5-10% $SO_2$) has been used successfully to produce sulfuric acid or elemental sulfur. Unfortunately, in some processes, such as reverberatory or blast processes and in coal power plants, exhaust gases contain relatively low sulfur content (less than 2-3% $SO_2$) and its processing is extremely difficult and not economically viable. These gases emitted into the atmosphere, contaminating it and forming acid rains. Purification and neutralization of gases with low content of sulfur is a priority problem.

SUMMARY OF THE INVENTION

In one embodiment, this invention provides.
a method for removing sulfur dioxide from flue gas, said method comprises:
  providing a flue gas comprising a sulfur dioxide;
  absorbing said sulfur dioxide with molten carbonate forming a molten mixture of carbonates sulfites and sulfates at a temperature of between 400° C. to 600° C.;
  treating said molten mixture with a natural gas and optionally with an oxidant, by passing said natural gas through said molten mixture, thereby producing a sulfur containing vapor;
  cooling said sulfur containing vapor and collecting it.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1A:
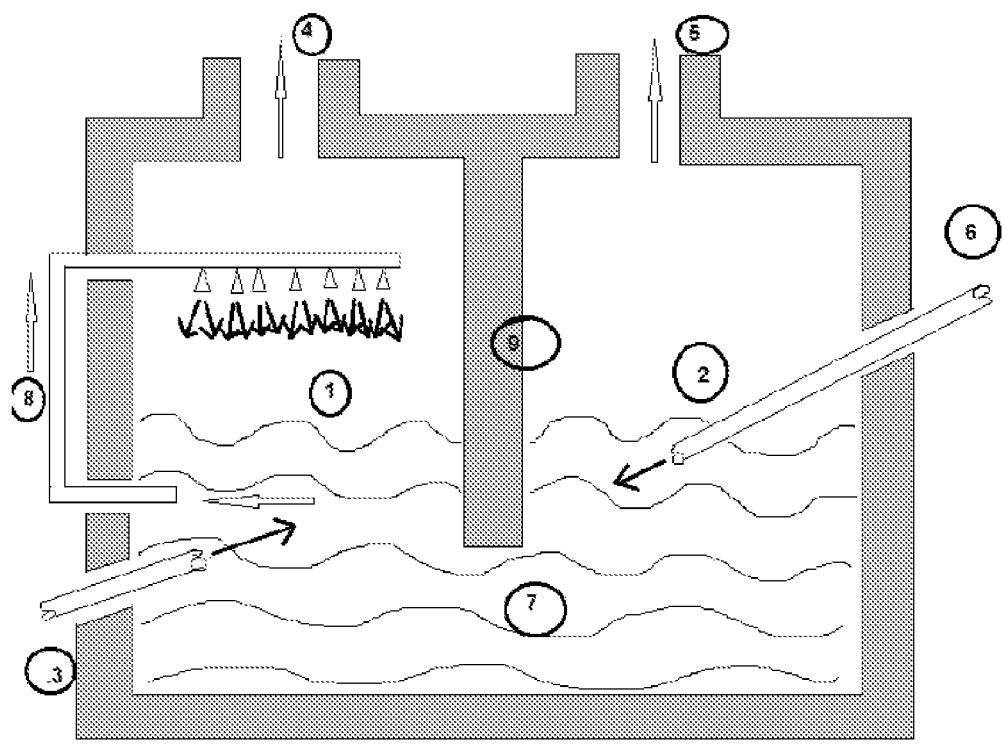
FIGS. 1A and 1B are schematic illustration of an apparatus for removing sulfur dioxide from a flue gas, according to an embodiment of the present invention. Including one unit comprising a scrubbing chamber (1); regeneration chamber (2); an inlet for off gas (flue gas) including $SO_2$ (3); an outlet for the scrubbed gas (4); an outlet for the sulfur containing gas (5); inlet for natural gas (6); carbonate melt (7); and molten mixture manifold (8); and a separating wall (9) with hydraulic communication through the common molten pool.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

In one embodiment, this invention provides a method for removing sulfur dioxide from a flue gas, the method comprising: flue gases desulfurization using molten carbonate melt and chemical regeneration of carbonate melt by natural gas and optionally with an oxidant.

In one embodiment, this invention provides a method for removing sulfur dioxide from flue gas, said method comprises:
providing a flue gas comprising a sulfur dioxide;
absorbing said sulfur dioxide with molten carbonate forming a molten mixture of carbonates, sulfites and sulfates under heating;
treating said molten mixture with a natural gas and optionally with an oxidant, by passing said natural gas through said molten mixture, thereby producing a sulfur containing vapor;
cooling said sulfur containing vapor and collecting it.

It is known that a desulfurization method based on molten eutectic mixture of lithium (Li), sodium (Na), and potassium (K) carbonates can be used to scrub a flue gas. In particular, it was shown that by using a spray of molten Na, K and Li carbonate eutectic, large quantities of a flue gas can be almost completely scrubbed of $SO_2$ (i.e., down to 0.001%) with a relatively small amount of melt (see, for example, R. A. McIlroy, et al., Environmental Science & Technology, 7(11), 1022 (1973)). In another embodiment, the eutectic mixture includes $Li_2CO_3$-43.5 mol %, $Na_2CO_3$-31.5 mol %, $K_2CO_3$-25.0 mol % and it melts at about 395° C.

Na—K—Li carbonate eutectic has a solidification point of 395° C. The reaction between $SO_2$ and the molten carbonate is rapid between the solidification point and 600° C., and the $SO_2$ is shifted almost completely to $SO_3^{2-}$:

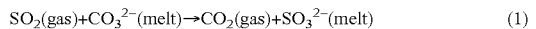
$$SO_2(gas)+CO_3^{2-}(melt)\rightarrow CO_2(gas)+SO_3^{2-}(melt) \quad (1)$$

Some of the $SO_2$ is oxidized to $SO_3$ and then reacts with the melt:

$$SO_2(gas)+\tfrac{1}{2}O_2(gas)\rightarrow SO_3(gas) \quad (2a)$$

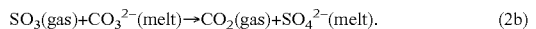
$$SO_3(gas)+CO_3^{2-}(melt)\rightarrow CO_2(gas)+SO_4^{2-}(melt). \quad (2b)$$

Most of the sulfite ($SO_3^{2-}$) in the melt is eventually oxidized to sulfate ($SO_4^{2-}$):

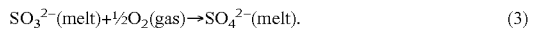
$$SO_3^{2-}(melt)+\tfrac{1}{2}O_2(gas)\rightarrow SO_4^{2-}(melt). \quad (3)$$

As a result, the carbonate melt becomes a mixture of carbonates, sulfates and sulfites. In one embodiment the flue gas includes oxygen ($O_2$) which oxidizes the sulfites to sulfates as presented in equation (3) and the $SO_2$ to $SO_3$, as presented in equation (2a).

Melt regeneration process of removing sulfates from the melt, which is necessary for continuous operation, includes reduction of $S^{6+}$ to $S^{2-}$ by natural gas (reduction of $M_2SO_4$ to $H_2S$).

Thermodynamic calculations of the following equations show that the free Gibbs energy of the reactions:

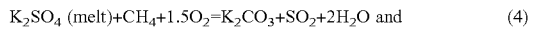
$$K_2SO_4 \text{ (melt)}+CH_4+1.5O_2=K_2CO_3+SO_2+2H_2O \text{ and} \quad (4)$$

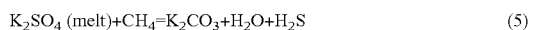
$$K_2SO_4 \text{ (melt)}+CH_4=K_2CO_3+H_2O+H_2S \quad (5)$$

have significant negative value (more than −100 kJ/mole).

In one embodiment, ~0.1-0.5 m³ of natural gas are required per 1 kg of sulfite/sulfates in the molten mixture of carbonates in order to regenerate the sulfur containing vapor.

In one embodiment, the desulfurization method of this invention comprises the following chemical reactions between the sulfur dioxide and the molten carbonates:

$$M_2CO_3+SO_2+0.5\,O_2=M_2SO_4 \text{ (melt)}+CO_2 \text{ (gas)} \quad (6)$$

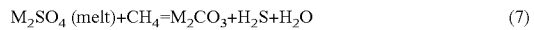
$$M_2SO_4 \text{ (melt)}+CH_4=M_2CO_3+H_2S+H_2O \quad (7)$$

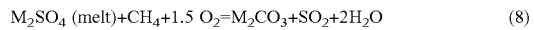
$$M_2SO_4 \text{ (melt)}+CH_4+1.5\,O_2=M_2CO_3+SO_2+2H_2O \quad (8)$$

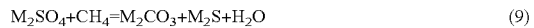
$$M_2SO_4+CH_4=M_2CO_3+M_2S+H_2O \quad (9)$$

$$H_2S+1.5\,O_2=H_2O+SO_2 \quad (10)$$

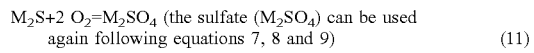
$$M_2S+2\,O_2=M_2SO_4 \text{ (the sulfate } (M_2SO_4) \text{ can be used again following equations 7, 8 and 9)} \quad (11)$$

wherein M=Li, Na, K or combination thereof.

In one embodiment, the method of desulfurization comprises absorbing a sulfur dioxide with molten carbonate forming a molten mixture of carbonates, sulfites and sulfates. In another embodiment, the molten mixture is Li, Na, K carbonates, sulfites and sulfates or combination thereof. In another embodiment, the absorbing step is performed at a temperature of between 400° C. to 600° C. In another embodiment, the absorbing step is performed at a temperature of between 400° C. to 500° C. In another embodiment, the absorbing step is performed at a temperature of between 400° C. to 450° C. In another embodiment, the absorbing step is performed at a temperature of between 450° C. to 500° C. In another embodiment, the absorbing step is performed at a temperature of between 500° C. to 550° C. In another embodiment, the absorbing step is performed at a temperature of between 550° C. to 600° C. In another embodiment, the absorbing step is performed at a temperature of between 400° C. to 600° C. wherein the molten carbonate is at a temperature of between 400° C. to 600° C. In another embodiment, the absorbing step is performed at a temperature of between 400° C. to 500° C. wherein the molten carbonate is at a temperature of between 400° C. to 500° C. In another embodiment, the absorbing step is performed at a temperature of between 400° C. to 450° C. wherein the molten carbonate is at a temperature of between 400° C. to 450° C. In another embodiment, the absorbing step is performed at a temperature of between 450° C. to 500° C. wherein the molten carbonate is at a temperature of between 450° C. to 500° C. In another embodiment, the absorbing step is performed at a temperature of between 500° C. to 550° C. wherein the molten carbonate is at a temperature of between 500° C. to 550° C. In another embodiment, the absorbing step is performed at a temperature of between 550° C. to 600° C. wherein the molten carbonate is at a temperature of between 550° C. to 600° C.

In one embodiment, the absorbing step is conducted under turbulence. In one embodiment, the absorbing step is conducted under laminar flow. In one embodiment, the absorbing step is conducted under stirring. In another embodiment, the absorbing step is conducted by stirring under flow of bubbling gas.

In one embodiment, the method of this invention comprises a formation of a molten mixture comprising carbonates, sulfites and sulfates. In another embodiment, the molten mixture is formed in the presence of an oxidant. In another embodiment, the oxidant is $O_2$ or air. In another embodiment, the flue gas includes oxygen ($O_2$), which is used to convert a sulfite ($SO_3^{2-}$) to sulfate ($SO_4^{2-}$) and sulfur dioxide ($SO_2$) to sulfur trioxide ($SO_3$) (see equations (2a) and (3)).

In one embodiment, the method of desulfurization comprises treating the molten mixture with a natural gas, by passing the natural gas through said molten mixture, thereby producing a sulfur containing vapor. In another embodiment, the method of desulfurization comprises treating the molten mixture with a natural gas and an oxidant, by passing the natural gas and the oxidant through said molten mixture, thereby producing a sulfur containing vapor. In another embodiment the natural gas is methane, ethane, propane, butane, pentane, acetylene or combination thereof. In another embodiment, the natural gas further comprises nitrogen. In another embodiment, the natural gas is methane—92.6 (volumetric %); ethane—4.07 (volumetric %); propane—1.07 (volumetric %); butane—0.44 (volumetric %); pentane—0.42 (volumetric %) and $N_2$–0.9 (volumetric %). In another embodiment, the natural gas further comprises an oxidant. In another embodiment the natural gas is methane. In another embodiment the natural gas is ethane. In another embodiment the natural gas is propane. In another embodiment the natural gas is butane. In another embodiment the natural gas is pentane. In another embodiment the natural gas is acetylene. In another embodiment the oxidant is air or $O_2$.

In one embodiment, the natural gas and the optional oxidant are added simultaneously. In another embodiment, the molten mixture of carbonates, sulfites and sulfates is treated with the natural gas first followed by the treatment of the oxidant.

In another embodiment, the treatment step of the molten mixture with a natural gas comprises heating the molten mixture to a temperature of between 400° C. to 1000° C. In another embodiment, to a temperature between 400° C. to 800° C. In another embodiment, to a temperature between 400° C. to 600° C. In another embodiment, to a temperature between 400° C. to 500° C. In another embodiment, to a temperature between 400° C. to 450° C. In another embodiment, to a temperature between 450° C. to 500° C. In another embodiment, to a temperature between 500° C. to 550° C. In another embodiment, to a temperature between 550° C. to 600° C.

In one embodiment, the treatment step of the molten mixture with a natural gas comprises passing between 0.01 to 0.5 $m^3$ of natural gas per 1 kg of sulfates/sulfites through the molten mixture. In another embodiment, passing between 0.1 to 0.5 $m^3$ of natural gas per 1 kg of sulfates/sulfites. In another embodiment, passing between 0.1 to 0.4 $m^3$ of natural gas per 1 kg of sulfates/sulfites. In another embodiment, passing between 0.1 to 0.3 $m^3$ of natural gas per 1 kg of sulfates/sulfites.

In another embodiment, the method for removing sulfur dioxide from flue gas, includes cooling the sulfur containing vapor and collecting it. In another embodiment, the sulfur containing gas is collected and converted into solid or liquid for further use. In another embodiment, the sulfur containing vapor is $SO_2$, $SO_3$, $H_2S$. In another embodiment, the sulfur containing gas is collected and used for the production of liquid or solid sulfur containing material including for example elemental sulfur or $H_2SO_4$.

In one embodiment, the method of this invention comprises an absorbing step and a treating step. In another embodiment, the method of this invention which comprises an absorbing step and a treating step is conducted in any known setup as depicted and presented in the art. In another embodiment the absorbing step and the treating step are conducted in a setup of one unit including a scrubbing zone and a regeneration zone separated by a separating wall or the absorbing step and the treating step are conducted in two separated units, a scrubbing zone and a separated zone separated by a pipeline; wherein said scrubbing zone is for the absorbing step and the regeneration zone is for the treating step and said units are connected via hydraulic communication. In another embodiment, the absorbing step and the treating step are conducted in a setup of one unit without any physical separation; wherein the unit includes a reaction zone; and wherein the reaction zone acts as scrubbing zone for the absorbing step or as regeneration zone for the treating step. In another embodiment, a reaction chamber comprises the reaction zone. In another embodiment, a reaction chamber acts as scrubbing chamber for the absorbing step or as regeneration chamber for the treating step. In another embodiment, a reaction chamber comprises a furnace, a reactor or any other vessel where absorbing or treating step can be conducted within, as known in the art.

In some embodiments, a scrubbing chamber within the different setups of this invention comprises the scrubbing zone. In some embodiments, a regeneration chamber within the different setups of this invention comprises the regeneration zone.

In one embodiment, the scrubbing chamber is configured for scrubbing the flue gas by absorbing the sulfur dioxide in a pool to form a molten mixture of carbonates, sulfites and sulfates in the pool. In another embodiment, the scrubbing chamber comprises a plurality of baffles arranged within said scrubbing chamber and configured to provide a flow of said flue gas within the scrubbing zone. In another embodiment, flow of the flue gas is provided in the scrubbing chamber.

In one embodiment, the regeneration chamber is being configured for producing a sulfur-containing vapor; and comprising a sulfur-containing vapor outlet port configured for controllable release of the sulfur-containing vapor obtained therein.

In one embodiment, in the scrubbing chamber, an ingress flow of a flue gas interacts with the molten carbonates, resulting in chemical absorbance of the sulfur dioxide and in discharge of a scrubbed gas. In one embodiment, in the regeneration chamber, a chemical regeneration of the molten mixture of carbonates, sulfites and sulfates takes place, resulting in formation of sulfur-containing vapor which is collected and cooled down for converting the sulfur-containing vapor into a liquid and solid phase for a further utilization. In another embodiment, the sulfur containing vapor is $SO_2$, $SO_3$, $H_2S$. In another embodiment, the sulfur containing gas is collected and used for the production of liquid or solid containing material including for example elemental sulfur or $H_2SO_4$.

According to some embodiments, the regeneration chamber comprises a natural gas inlet port and optionally an oxidant inlet port configured for receiving natural gas, and optionally an oxidant directing the gas/oxidant into the pool to form a regeneration zone configured to provide chemical regeneration of the molten mixture and to produce the sulfur-containing vapor. In another embodiment, the natural gas and the oxidant are added simultaneously. In another embodiment, the molten mixture is treated with the natural gas first followed by the treatment of the oxidant.

In one embodiment, the method of this invention provides a cooling step, wherein said sulfur containing vapor is cooled, collected and converted to a solid or liquid sulfur containing material for further use. In another embodiment, the sulfur containing vapor is removed from the regeneration chamber via an outlet and being cooled, collected and converted to a solid and/or liquid. In another embodiment, the sulfur containing vapor is cooled to a temperature between 250° C.-600° C. Examples of the solid or liquid sulfur containing material include, inter alia, elemental sulfur and gas $SO_2$, $SO_3$, $H_2S$. These $SO_2$, $SO_3$, $H_2S$ gas materials can, for example, be used for production of elemental sulfur or sulfuric acid ($H_2SO_4$).

In one embodiment, the method of desulfurization of this invention which comprises an absorbing step and a treating step is conducted in any known apparatus and for any scale, as depicted and presented in the art.

In another embodiment, the method of desulfurization of this invention uses an apparatus as presented in FIG. 1A. In another embodiment, the method of desulfurization of this invention uses an apparatus as presented in FIG. 1B. In another embodiment, the method of desulfurization of this invention uses an apparatus as presented in FIG. 2A. In another embodiment, the method of desulfurization of this invention uses an apparatus as presented in FIG. 2B. In another embodiment, the method of desulfurization of this invention uses an apparatus as presented in FIG. 3. In another embodiment, the method of desulfurization of this invention uses an apparatus as presented in FIG. 6.

According to an embodiment of the present invention, with reference to FIGS. 1A, 1B, 2A and 2B the apparatus for removing sulfur dioxide ($SO_2$) from a flue gas includes a housing a scrubbing chamber 1 and a regeneration chamber 2. An inner surface of the housing may be made of an alloy containing at least one element selected from titanium, aluminium, zirconium, tantalum and niobium.

The scrubbing chamber 1 includes a flue gas inlet port 3 configured for receiving an ingress flow of the flue gas and a scrubbed gas outlet port 4 configured for discharging an egress flow of a scrubbed gas from the scrubbing chamber 1.

According to an embodiment of the present invention, the scrubbing chamber 1 includes a nozzle coupled to the flue gas inlet port 3 inside the scrubbing chamber 1. The nozzle is configured to regulate direction of the ingress flow of the flue gas into the scrubbing chamber 1. For this purpose, in order to provide desired flow of the flue gas within the scrubbing zone 1, the nozzle can be controllable bent by a solid angle of 0 to 180 degrees with respect to the vertical scrubbing chamber wall.

For example, the ingress flow of the flue gas may include $SO_2$ at a concentration of about 0.01-5 volume %, $O_2$ at a concentration of about 0.5-5 volume %, $CO_2$ at a concentration of about 0-25 volume %, $H_2O$ at a concentration of about 0-20 volume %, $N_2$ and inevitable impurities as a remainder. In turn, the egress flow of the scrubbed gas differs from the ingress flow in the fact that it does not contain $SO_2$ at all or contains it at a substantially reduced concentration.

According to an embodiment of the present invention, the scrubbing chamber (for example 1 in FIGS. 1A, 1B, 2A, 2B) contains a molten eutectic mixture of lithium, sodium and potassium carbonates. The scrubbing chamber forms a scrubbing zone configured for scrubbing the flue gas by absorbing the sulfur dioxide. In operation, after the absorbing of the sulfur dioxide from the ingress flow, a pool with a molten mixture of carbonates, sulfites and sulfates is formed within the scrubbing chamber. The pool 7 (for example 7 in FIGS. 1A, 1B, 2A, 2B) is also common for the scrubbing chamber and the regeneration chamber 2 (for example 2 in FIGS. 1A, 1B, 2A, 2B), thereby providing hydraulic communication there between. There are advantages of an apparatus with the common pool over the apparatus in which the scrubbing chamber and the regeneration chamber are two separated chambers communicating via a suitable pipeline. In particular, the provision with a common pool allows reducing heat losses, because for same melt quantity the total surface of the apparatus with total molten pool is less than the total surface of the scrubbing chamber and the regeneration chamber connected by a pipeline 10 (for example 10 in FIGS. 1A, 1B, 2A, 2B). The provision of the present invention may result in a decrease of consumption of electric power (or fuel) for the chambers to be heated and maintained at the operating temperature. Moreover, the provision with a common pool allows reduction of the risk of melt solidification in the pipes and the difficulty of selection of materials for the pipes. Furthermore there is no need in the device with a common pool in pumps for transferring melts from the scrubbing chamber 1 to the regeneration chamber 2 at high temperatures (i.e., 400° C.-600° C.), which can be a separate technical problem, when the scrubbing chamber 1 and the regeneration chamber 2 are separated.

The scrubbed gas (containing the components of the ingress gas mixture but without $SO_2$) is discharged through the scrubbed gas outlet port 4 (for example 4 in FIGS. 1A, 1B, 2A, 2B).

In operation, a flow of the flue gas in the scrubbing chamber 1 within the scrubbing zone is a flow of bubbling gas. In order to provide flow of bubbling gas within the scrubbing zone, the scrubbing chamber includes a plurality of baffles arranged within the scrubbing chamber. Generally, any suitable number of the baffles can be provided to provide desired flow of the flue gas within the scrubbing zone 1.

Figure 1B:
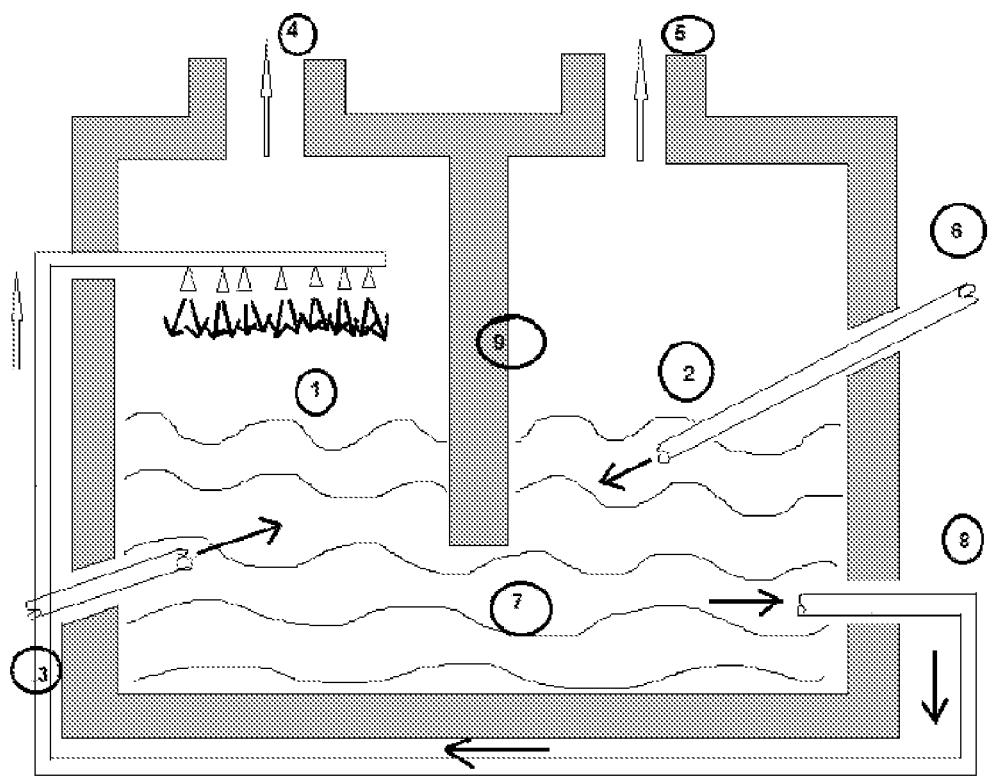
Figure 2A:
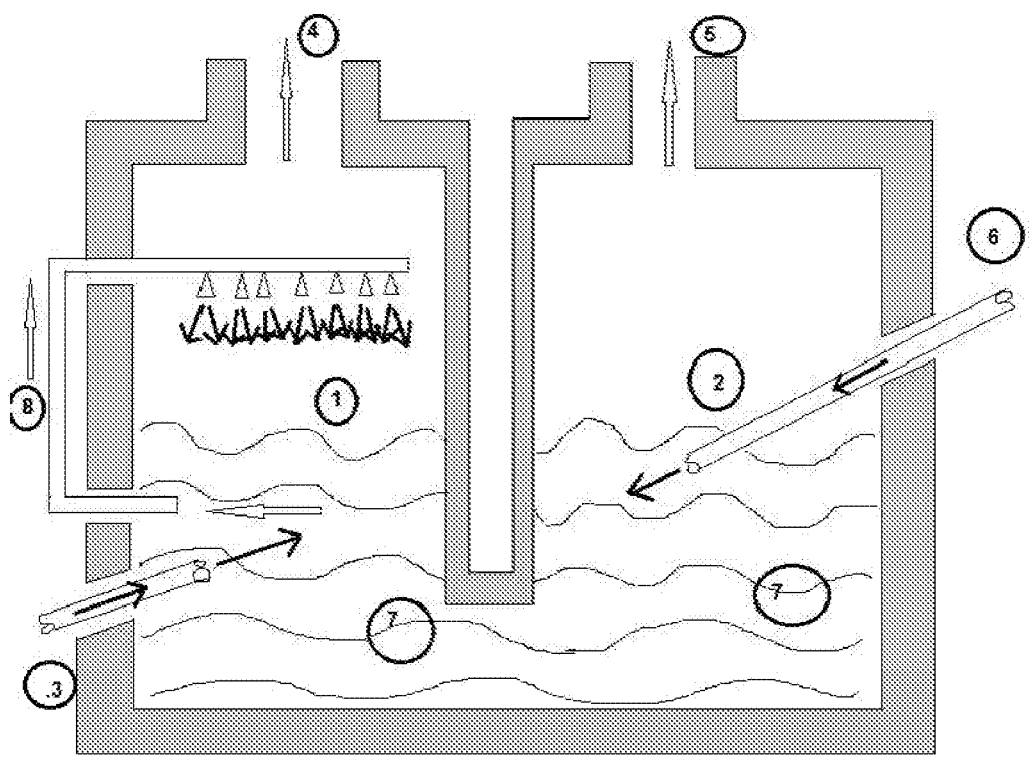
FIGS. 2A and 2B are schematic illustration of an apparatus for removing sulfur dioxide from a flue gas, according to an embodiment of the present invention. Including two separate units connected by a conduit comprising a scrubbing chamber (the first unit) (1); regeneration chamber (the second unit) (2); an inlet for off gas (flue gas) including $SO_2$ (3); an outlet for the scrubbed gas (4); an outlet for the sulfur containing gas (5); inlet for natural gas (6); carbonate melt (7); molten mixture manifold (8); and a conduit (9) connecting between the scrubbing zone, unit (1) and the regeneration zone, unit (2), wherein the scrubbing zone (1) is separated from the regeneration zone with hydraulic communication there between through a common molten pool.
Figure 2B:
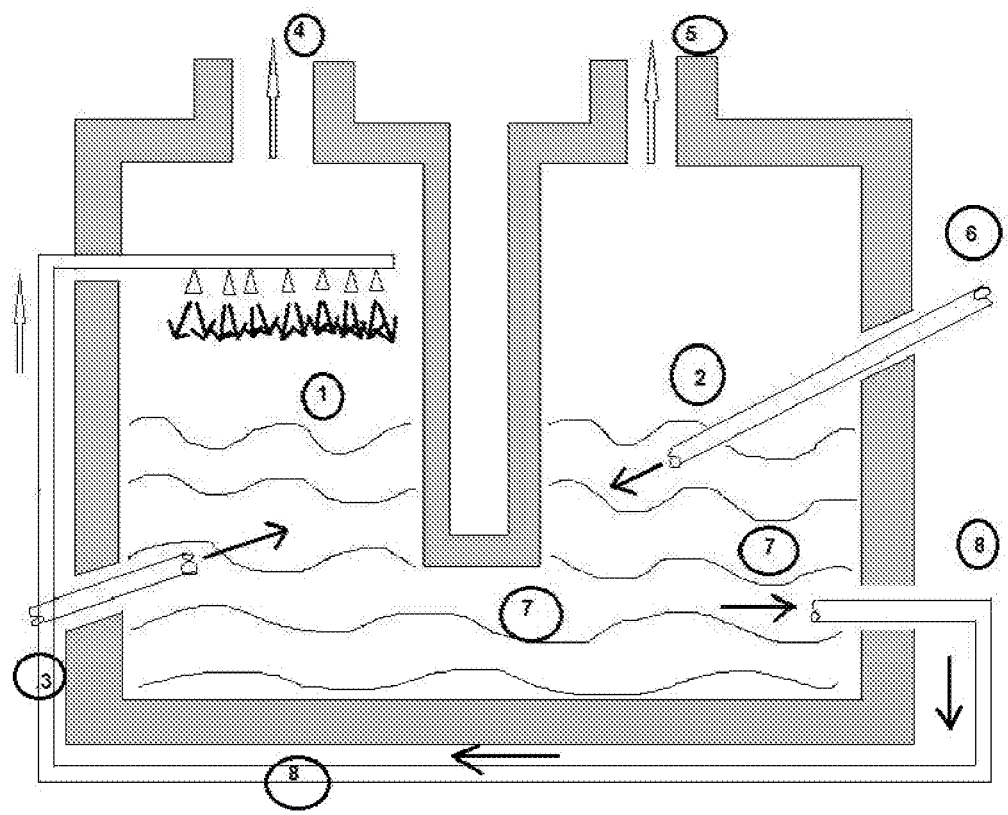
Figure 3:
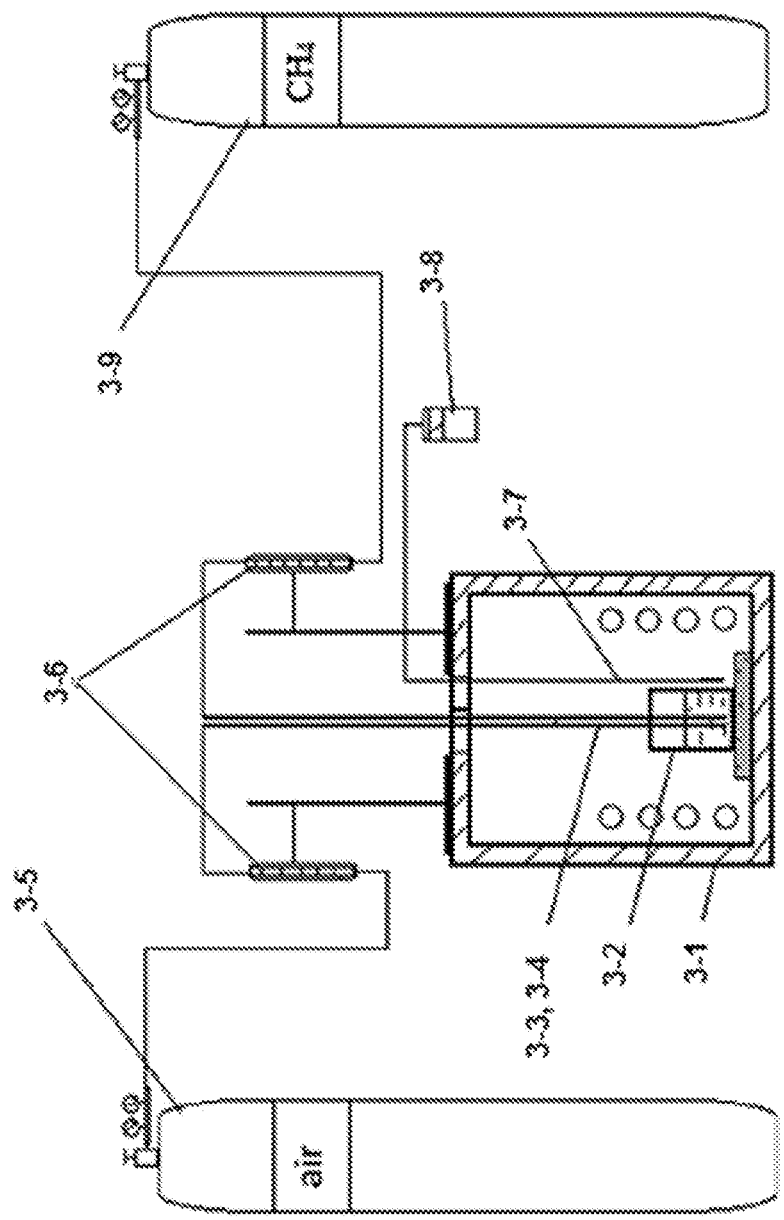
FIG. 3 is a schematic illustration of an apparatus for removing sulfur dioxide from a flue gas, according to an embodiment of the present invention. (3-1)—a reaction chamber which is a furnace; (3-2)—crucible; (3-3) and (3-4)—tubes for separately supplying air and natural gas; (3-5)—air cylinder; (3-6)—flowmeters for air and natural gas; (3-7)—thermocouple type K; (3-8)—temperature controller; (3-9)—natural gas cylinder.

The regeneration chamber 2 is separated from the scrubbing chamber 1 by a separating wall 9 (for example in FIGS. 1A and 1B) or by a pipeline 10 (FIGS. 2A and 2B). The separating wall 9 (for example in FIGS. 1A and 1B) extends downward from a top housing wall and is immersed in the pool 7 formed by the molten mixture of carbonates, sulfites and sulfates. According to an embodiment, the separating wall 9 has an open region between the scrubbing chamber 1 and the regeneration chamber 2. The length of the open region is in the range of about 30% to about 50% of the depth of the pool 7 of the molten mixture of carbonates, sulfites and sulfates. Such a provision of the separating wall 9 provides a hydraulic communication of the molten mixture between the scrubbing chamber 1 and the regeneration chamber 2 within the pool 7.

According to some embodiments of the present invention, the apparatus includes a housing defining (by the housing walls) a scrubbing chamber and a regeneration chamber separated from the scrubbing chamber by a separating wall or by a pipeline. The separating wall has an open region to provide a hydraulic communication between the scrubbing chamber through a pool common for the scrubbing chamber and the regeneration chamber and comprising a molten eutectic mixture of lithium, sodium and potassium carbonates.

According to an embodiment, the scrubbing chamber includes a scrubbing chamber heater configured to melt eutectic mixture of lithium, sodium and potassium carbonates and thereby to provide the molten mixture thereof; and to maintain the molten mixture at a first predetermined temperature. For example, the first predetermined temperature can be in the range of about 400° C. to about 600° C. In order to withstand such great temperatures, an inner surface of the housing walls of the scrubbing chamber can, for example, be made of titanium. In another embodiment, the housing walls can be made of any stainless steel known in the art that can withstand the high temperatures of the current invention. In another embodiment, the housing walls can be made of stainless steel AISI 201 (austenitic chromium-nickel-manganese stainless steel). In another embodiment, the housing walls can be made of stainless steel 12H15G9ND (chromium-manganese stainless steel).

The regeneration chamber can include a regeneration chamber heater configured to heat and maintain the molten mixture of carbonates, sulfites and sulfates at a second predetermined temperature. For example, the second predetermined temperature can be in the range of about 400° C. to about 1000° C. In order to withstand such great temperatures, an inner surface of the housing walls of the regeneration chamber can, for example, be made of titanium. In another embodiment, the housing walls can be made of any stainless steel known in the art that can withstand the high temperatures of the current invention. In another embodiment, the housing walls can be made of stainless steel AISI 201 (austenitic chromium-nickel-manganese stainless steel). In another embodiment, the housing walls can be made of stainless steel 12H15G9ND (chromium-manganese stainless steel).

The regeneration chamber includes a natural gas inlet 6 (for example 6 in FIGS. 1A, 1B, 2A, 2B) configured for receiving natural gas and directing it into the pool to form a regeneration zone configured to provide chemical regeneration of the molten mixture and to produce said sulfur-containing vapor. The natural gas inlet is configured to regulate the ingress flow rate of the reductant gas. In operation, the reductant gas is passed through the pool of the molten mixture of carbonates, sulfites and sulfates in the pool. When desired, the molten mixture of carbonates, sulfites and sulfates can be heated and maintained at the pool at a temperature can for example be in the range of about 400° C. to about 1000° C. In order to withstand such great temperatures, an inner surface of the housing walls of the natural gas inlet can, for example, be made of titanium. In another embodiment, the housing walls can be made of any stainless steel known in the art that can withstand the high temperatures of the current invention. In another embodiment, the housing walls can be made of stainless steel AISI 201 (austenitic chromium-nickel-manganese stainless steel). In another embodiment, the housing walls can be made of stainless steel 12H15G9ND (chromium-manganese stainless steel).

The regeneration chamber also includes one or more sulfur-containing vapor outlet ports (only one outlet port 5 is shown in FIGS. 1A, 1B and 2A, 2B), and one or more corresponding cooling manifolds through which a sulfur-containing vapor resulting from the regeneration zone releases from the regeneration chamber. The cooling manifold is configured for cooling down said sulfur-containing vapor, and thereby converting the sulfur-containing vapor into a liquid and solid phase materials. The cooling manifold can be a tube made of a heat conductive material which is open to the atmospheric air and placed at the room temperature. In this case, the cooling of the sulfur-containing vapor can be carried out during the passing of the material through the cooling manifold. When desired, the cooling manifold can be arranged within a dedicated cooling device (not shown).

The apparatus for removing sulfur dioxide may include a sulfur-containing material collector coupled to the sulfur-containing vapor outlet port via the cooling manifold. The sulfur-containing vapor is converted to liquid and solid phase materials for further use including, elemental sulfur, sulfuric acid ($H_2SO_4$).

The sulfur-containing material collector can be any suitable vessel such as a container, tank, chamber, cartridge, housing, frame or any other structure that can be used for collecting and storing the liquid and solid phase materials obtained during the regeneration in accordance with the teaching of the present invention.

When desired, the molten eutectic mixture can also be provided from the pool in a liquid state and sprayed within the scrubbing chamber via a molten mixture manifold. Referring to 8 in FIGS. 1A and 1B, in one embodiment the molten mixture manifold 8 is provided from the scrubbing chamber 1 (FIG. 1A), in another embodiment, the molten mixture manifold 8 is provided from the regeneration chamber (FIG. 1B). The molten mixture manifold 8 is arranged at a bottom of the scrubbing chamber 1 (FIG. 1A) or the bottom of the regeneration chamber 2 (FIG. 1B) within the pool, and a molten mixture inlet port arranged at a top of the scrubbing chamber 1, which also includes a sprinkler coupled to the molten mixture inlet port from the inner side of the top scrubbing chamber wall of the scrubbing chamber 1. The molten mixture manifold provides circulation of the molten mixture from the pool at the bottom of the scrubbing chamber or the bottom of the regeneration chamber to the top of the scrubbing chamber for spraying within the scrubbing chamber through the sprinkler. The driving force for the circulation of the molten mixture is provided by a pump associated with the molten mixture manifold.

Referring to FIGS. 2A and 2B, illustrating a schematic view of an apparatus for use for removing sulfur dioxide from a flue gas, according to yet an embodiment of the present invention. The apparatus differs from the apparatus of FIGS. 1A and 1B in the fact that regeneration chamber 2 is separated from the scrubbing chamber 1 by a pipeline 10 which provides a hydraulic communication of the molten mixture between the scrubbing chamber 1 and the regeneration chamber 2.

Referring to FIGS. 2A and 2B, in one embodiment the molten mixture manifold 8 is provided from the scrubbing chamber 1 (FIG. 2A), in another embodiment, the molten mixture manifold 8 is provided from the regeneration chamber (FIG. 2B). The molten mixture manifold 8 is arranged at a bottom of the scrubbing chamber 1 (FIG. 2A) or the bottom of the regeneration chamber 2 within the pool (FIG. 2B), and a molten mixture inlet port arranged at a top of the scrubbing chamber 1, which also includes a sprinkler coupled to the molten mixture inlet port from the inner side of the top scrubbing chamber wall of the scrubbing chamber 1. The molten mixture manifold 8 provides circulation of the molten mixture from the pool at the bottom of the scrubbing chamber 1 or the bottom of the regeneration chamber 2 to the top of the scrubbing chamber for spraying within the scrubbing chamber 1 through the sprinkler. The driving force for the circulation of the molten mixture is provided by a pump associated with the molten mixture manifold 8.

The method of the present invention is highly economical and advantageous. The use of natural gas is renders the method of this invention highly practical and of much lower cost. Natural gas is readily available on site where $SO_2$ needs to be removed from flue gases. This is the case in many industrial processes common to metallurgy. Accordingly, the use of natural gas as reductant gas is highly advantageous and provides a practical, low cost route for the regeneration of $SO_2$ from flue gases, without generation of additional solid or liquid waste.

In one embodiment, this invention provides a method for removing sulfur dioxide from a flue gas, the method comprising:
  providing a scrubbing zone and a regeneration zone separated from the scrubbing zone and being in a hydraulic communication there between through a pool common for the scrubbing chamber and the regeneration chamber, the pool comprising a molten eutectic mixture of lithium, sodium and potassium carbonates;

providing a controllable ingress flow of the flue gas into the scrubbing zone and thereby scrubbing said flue gas by absorbing said sulfur dioxide, and forming a molten mixture of carbonates, sulfites and sulfates along with a scrubbed gas;

discharging an egress flow of a scrubbed gas from the scrubbing zone;

producing a sulfur-containing vapor from said molten mixture of carbonates, sulfites and sulfates includes a melt regeneration process comprising the step of treating said molten mixture of carbonates, sulfites and sulfates with a natural gas and oxidant gas thereby providing a melt regeneration of said molten mixture of carbonates, sulfites and sulfates in said regeneration zone to produce a sulfur-containing vapor;

releasing said sulfur-containing vapor from said regeneration zone;

cooling down the released sulfur-containing vapor for converting said released sulfur-containing vapor into sulfur-containing liquid and solid phase materials; and collecting said sulfur-containing liquid and solid phase materials for a further utilization.

In one embodiment, the natural gas is selected from methane, ethane, propane, butane, acetylene, natural gas or any combination thereof.

In one embodiment, the natural gas is injected to said regeneration zone through said molten mixture of carbonates, sulfites and sulfates.

In one embodiment, the natural gas is injected to said regeneration zone through said molten mixture of carbonates, sulfites and sulfates to a depth in the range of about 15% to about 80% of the total depth of the said molten mixture of carbonates, sulfites and sulfates.

In one embodiment, the quantity of said natural gas is in the range of about 1 m$^3$ to about 5 m$^3$ per 10 kg of sulfates quantity in said molten mixture of carbonates, sulfites and sulfates.

In one embodiment, the oxidant gas is selected from oxygen, air, oxygen enriched air, or any other oxidant known in the art.

In one embodiment, the oxygen content in said oxidant gas is in the range of 0.1 weight percent to 98 weight percent.

In one embodiment, the oxidant gas is passing to said regeneration zone above the surface level of said molten mixture of carbonates, sulfites and sulfates.

In one embodiment, the oxidant gas is passing through said regeneration zone above the surface level of said molten mixture of carbonates, sulfites and sulfates simultaneously with the said natural gas which is injected to said regeneration zone through the said molten mixture of carbonates, sulfites and sulfates.

In one embodiment, the oxidant gas is injected to the said regeneration zone through the said molten mixture of carbonates, sulfites and sulfates after supply of the said natural gas is injected to said regeneration zone through the said molten mixture of carbonates, sulfites and sulfates.

In one embodiment, the oxidant gas is injected to said regeneration zone through the said molten mixture of carbonates, sulfites and sulfates to a depth in the range of about 15% to about 80% of the total depth of the said molten mixture of carbonates, sulfites and sulfates.

In one embodiment, the oxidant gas is injected to said regeneration zone through the said molten mixture of carbonates, sulfites and sulfates for 5-20 minutes.

In one embodiment, the method further comprises heating the pool in the scrubbing zone to a first predetermined temperature which is in the range of about 400° C. to about 600° C., and heating the pool in the regeneration zone to a second predetermined temperature which is in the range of about 400° C. to about 1000° C.

In one embodiment, the method further comprises providing a flow of said flue gas within the scrubbing zone.

In one embodiment, the method further comprises providing a flow of said oxidant gas within the regeneration zone.

In one embodiment, the method further comprises providing a flow of the said molten mixture of carbonates, sulfites and sulfates within the regeneration zone with the said natural gas and/or said oxidant gas injected to said regeneration zone through the said molten mixture of carbonates, sulfites and sulfates.

A "scrubber" refers, in one embodiment, to a material, composition or any combination thereof which is used to scrub a flue gas. In another embodiment, the material is an eutectic mixture which includes $Li_2CO_3$-43.5 mol %, $Na_2CO_3$-31.5 mol %, $K_2CO_3$-25.0 mol % and it melts at about 395° C.

It is to be understood that the phraseology and terminology employed herein are for the purpose of description and should not be regarded as limiting.

As such, those skilled in the art to which the present invention pertains, can appreciate that while the present invention has been described in terms of preferred embodiments, the conception, upon which this disclosure is based, may readily be utilized as a basis for the designing of other structures systems and processes for carrying out the several purposes of the present invention.

EXAMPLES

Example 1

Desulfurization of Sulfur in Melt Using Natural Gas and Air

Tests were carried out with synthetic melts (eutectic mixture $Na_2CO_3$—$K_2CO_3$—$Li_2CO_3$ with $K_2SO_4$ addition). The initial sulfur content in the melt was 4.5%. Synthetic melt was heated to 450° C.-500° C. After that natural gas and air was bubbling through the salt melt. After cooling, the salt melt was analyzed. Sulfur extraction was equal to more than 98%. Sulfur extraction was equal 85%-88% for tests with insufficient or excess amount of natural gas. Excess amount of natural gas increases the content of soluble sulfites and sulfides and reducing the sulfur recovery in the gas phase.

Results are presented in the Table 1:

|  | Test 1 | Test 2 | Test 3 | Test 4 | Test 5 | Test 6 | Test 7 |
|---|---|---|---|---|---|---|---|
| Eutectic mixture $Na_2CO_3$—$K_2CO_3$—$Li_2CO_3$ with $K_2SO_4$ quantity, kg | 1 | 1 | 1 | 1 | 1 | 1 | 1 |

-continued

|  | Test 1 | Test 2 | Test 3 | Test 4 | Test 5 | Test 6 | Test 7 |
|---|---|---|---|---|---|---|---|
| Initial sulfur content, % | 4.5 | 4.5 | 4.5 | 4.5 | 4.5 | 4.5 | 4.5 |
| Initial sulfate quantity, kg | 0.245 | 0.245 | 0.245 | 0.245 | 0.245 | 0.245 | 0.245 |
| Natural gas ($CH_4$ - 92.6%, $C_2H_6$ - 4.07%, $C_3H_8$ - 1.07%, $C_4H_{10}$ - 0.44%, $C_5H_{12}$ - 0.42%, $N_2$ - rest; by KazTransGaz) quantity, liters | 25 | 80 | 100 | 100 | 120 | 15 | 200 |
| Ratio quantity natural gas to sulfate quantity, $nm^3$/kg | 0.1 | 0.3 | 0.4 | 0.4 | 0.5 | 0.06 (out of range 0.1-0.5) | 0.8 (out of range 0.1-0.5) |
| Final sulfur content in the eutectic mixture, % | 0.14 | 0.10 | 0.11 | 0.11 | 0.09 | 0.68 | 0.55 |
| Sulfur extraction, % | 97.8 | 97.8 | 97.6 | 97.6 | 98.0 | 84.9 | 87.8 |

Example 2

Desulfurization of Sulfur in Melt: Comparing Natural Gas to Natural Gas and Air

Figure 4:
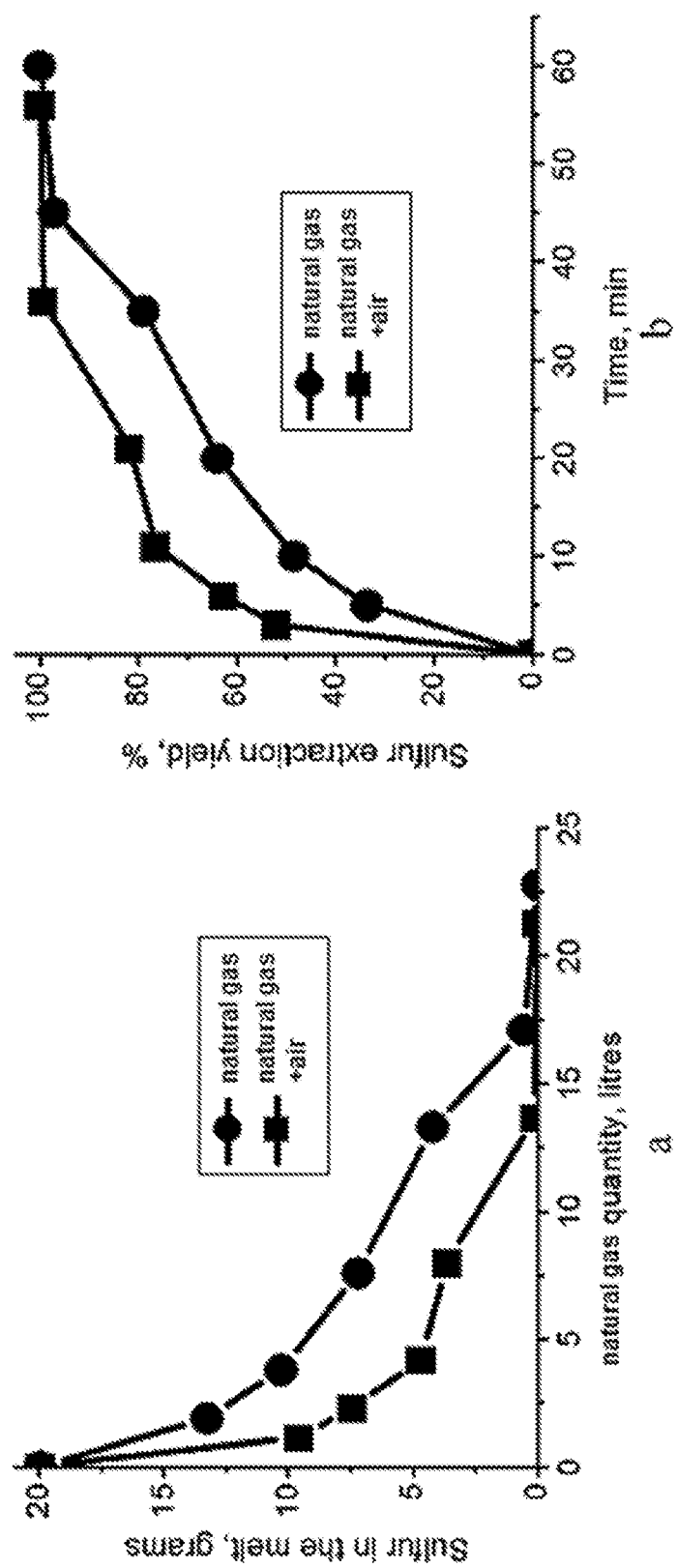
FIGS. 4A and 4B present results of sulfur content in the melt as a function of the volume of supplied natural gas (in litres) for natural gas and natural gas with air (FIG. 4A); and sulfur extraction yield as a function of test duration (in hours) for natural gas and natural gas with air (FIG. 4B).

Tests were carried out with synthetic melts (eutectic mixture $Na_2CO_3$—$K_2CO_3$—$Li_2CO_3$ with $K_2SO_4$ addition). The initial sulfur content in the melt was 5.6%. Synthetic melt was heated to 550° C. Preparation of the alkali metal carbonate/sulfate melt and all subsequent experiments were carried out at a temperature of 550° C. in a crucible welded from stainless steel AISI 201 (austenitic chromium-nickel-manganese stainless steel), which is stable with respect to the molten carbonate mixture. Dimensions of the crucible were: height—100 mm, diameter—60 mm, wall thickness—6 mm. The schematic of the laboratory setup is presented in FIG. 3. Initial weight of the carbonate-sulfate melt in all experiments was 351.4 g. Natural gas with the following composition(volume %) was used: methane—92.6; ethane—4.07; propane—1.07; butane—0.44; pentane—0.42 and $N_2$—0.9. Natural gas and air were supplied to the melt through separate stainless steel tubes (12H15G9ND chromium-manganese stainless steel) with a diameter of 10 mm. In all experiments, the natural gas was supplied at a rate of 0.38 1 $min^{-1}$. When natural gas was mixed with air, the flow rate of the air was 3.8 1 $min^{-1}$, i.e. ~0.8 liters of oxygen per min. The duration of each test was 60 minutes. For chemical analysis of the melt, 15-16 g samples were taken with a stainless steel rod. The cooled samples were ground and their composition determined using X-ray fluorescence spectrometry (XRF; PLP-21, AspapGeO, Almaty, Kazakhstan). As can be seen in table 2 and FIG. 4, one hour of bubbling natural gas alone through the melt was successful in completely removing the sulfur. Under the experimental conditions used, a 20% excess of natural gas relative to stoichiometry in reaction (7) was required for complete sulfur removal. However, bubbling air through the melt along with the $CH_4$ at ten times the flow rate of the $CH_4$ accelerate removal of sulfur. The quantity of natural gas required for complete regeneration according to reaction (7) or (4) then approximates the stoichiometric amount (FIG. 4a). For tests with natural gas flow of 0.38 1 $min^{-1}$ at 823 K, sulfur extraction yield was 6.7% $min^{-1}$. With the addition of air flow at 3.8 1 $min^{-1}$, the short time extraction yield was sharply accelerated to 17.3%. $min^{-1}$.

TABLE 2

Time dependence of the sulfur content of the carbonate melt at 823 K as determined by XRF

| Gas for carbonate melt regeneration | Test duration (min) | Natural gas (liters) | Oxygen (liters) | Sulfur in the melt (% wt) | Sulfur in the melt (grams) | Sulfur extraction yield (%) |
|---|---|---|---|---|---|---|
| Natural gas | 0 | 0 | — | 5.68 | 20 | 0 |
|  | 5 | 1.9 | — | 3.94 | 13.3 | 33.6 |
|  | 10 | 3.8 | — | 3.2 | 10.3 | 48.5 |
|  | 20 | 7.6 | — | 2.35 | 7.2 | 63.9 |
|  | 35 | 13.3 | — | 1.44 | 4.2 | 79 |
|  | 45 | 17.1 | — | 0.2 | 0.6 | 97.2 |
|  | 60 | 22.8 | — | 0.002 | 0.004 | 100 |
| Natural gas/air | 0 | 0 | 0 | 5.68 | 20 | 0 |
|  | 3 | 1.14 | 2.4 | 2.85 | 9.6 | 52 |
|  | 6 | 2.28 | 4.8 | 2.31 | 7.4 | 62.8 |
|  | 11 | 4.18 | 8.8 | 1.53 | 4.7 | 76.5 |
|  | 21 | 7.98 | 16.8 | 1.25 | 3.6 | 81.8 |
|  | 36 | 13.68 | 28.8 | 0.04 | 0.1 | 99.4 |
|  | 56 | 21.28 | 44.8 | 0.002 | 0.004 | 100 |

Example 3

Desulfurization of Sulfur From Off Gas Using Natural Gas and Air

Figure 6:
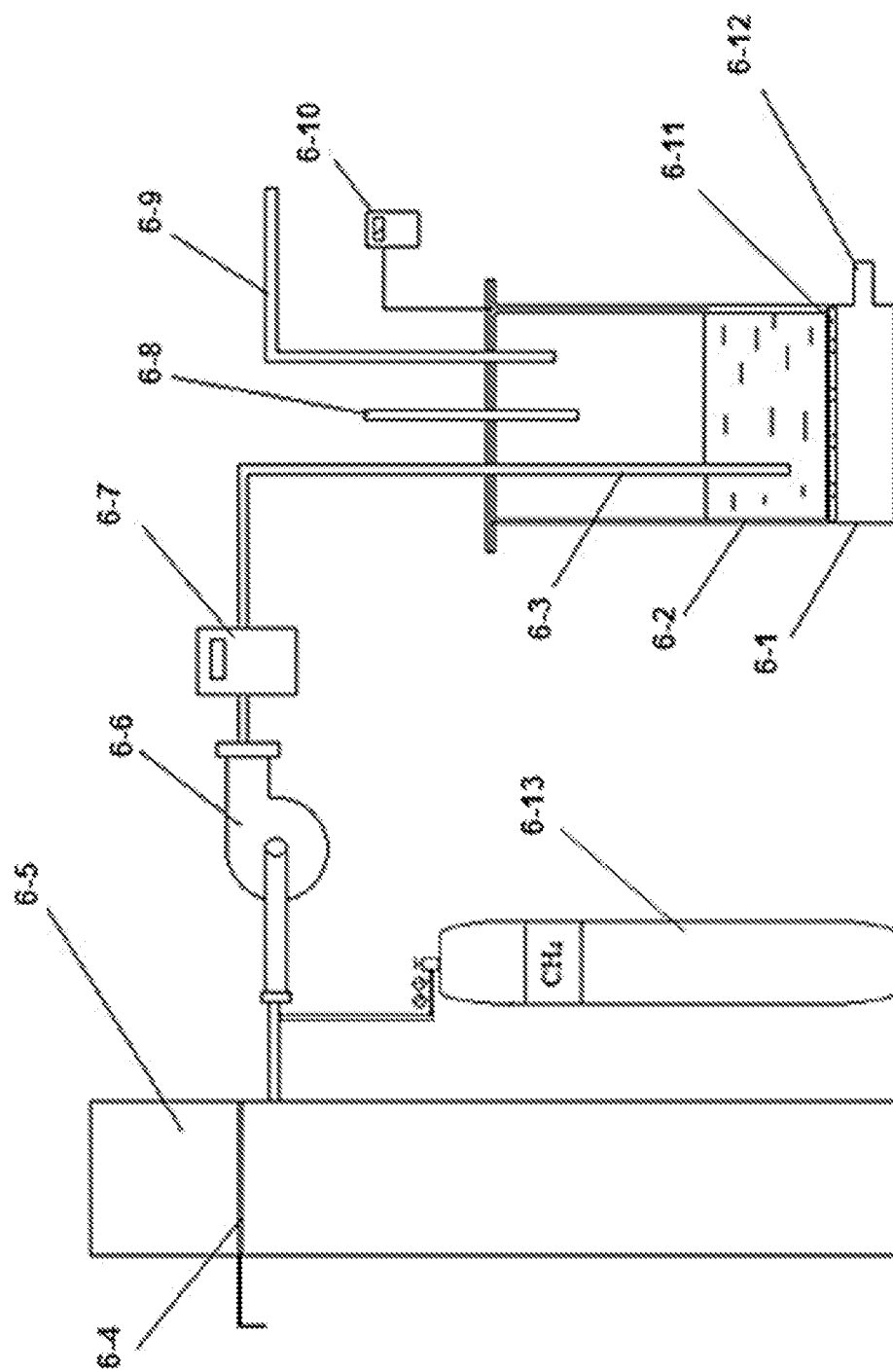
FIG. 6 is a schematic illustration of a pilot unit for removing sulfur dioxide from a flue gas, according to an embodiment of the present invention. (6-1)—casing of the unit; (6-2)—a reaction chamber which is a reactor; (6-3)—tube for supply of a flue gas to the reactor; (6-4)—flue damper; (6-5)—general pipe from boiler; (6-6)—the compressor; (6-7)—flowmeter; (6-8)—tube for gas and melt sampling; (6-9)—tube for the escape of gases from the reactor; (6-10)—thermocouple with the temperature controller; (6-11)—bottom; (6-12)—burner for unit heating; (6-13)—natural gas cylinder.

This experiment was divided into two stages: scrubbing and regeneration stages, both conducted in a unit as presented in FIG. 6. In the scrubbing stage, a volume of 15336 $m^3$ off gas (flue gas) passed in the system, from which 0.00273% (volumetric ratio) were $SO_2$. Sulfur content in the off gas was 39 mg/m³, $SO_2$ content in the off gas was 78 mg/m³, the duration of the scrubbing stage was 180 minutes and scrubber was 13.22 kg of the eutectic mixture $Na_2CO_3$—$K_2CO_3$—$Li_2CO_3$. Following the scrubbing stage, the sulfur content in the off gas was 1.93 mg/m³ and the $SO_2$ content in the off gas was 3.87 mg/m³, thus sulfur and $SO_2$ extraction efficiency was 95%.

Figure 5:
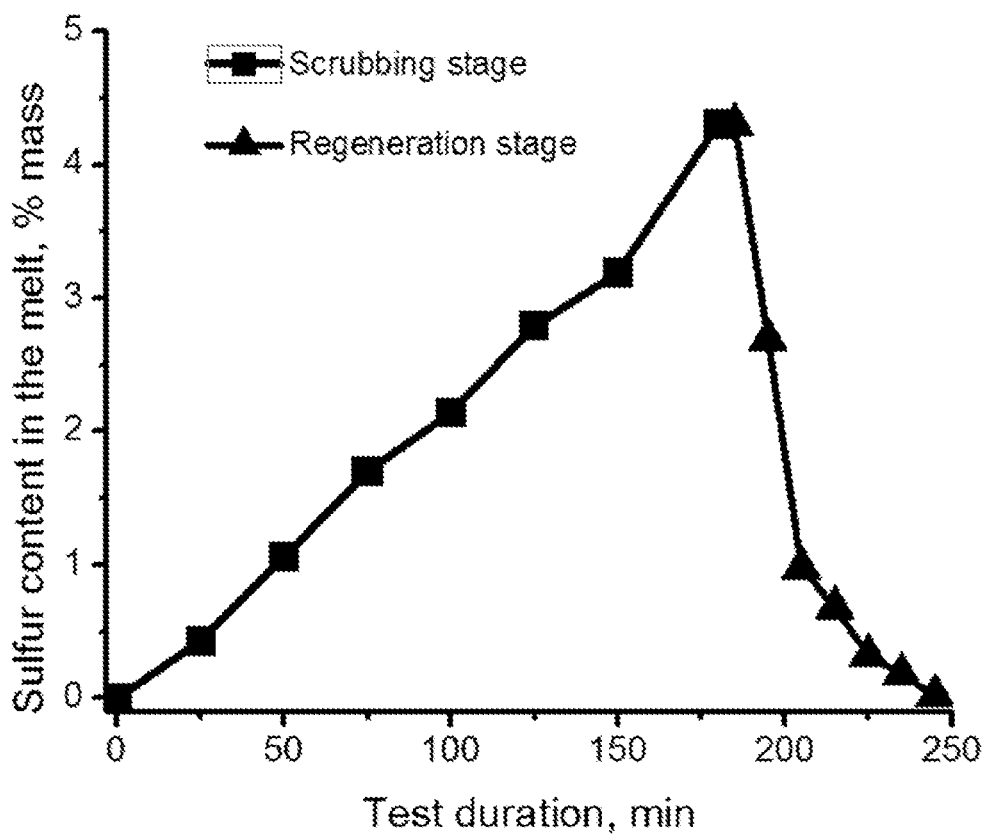
FIG. 5 depicts sulfur content in the melt as a function of test duration (in minutes), within scrubbing and regeneration stages.

The regeneration stage was conducted for 60 minutes, wherein 99.5% of the sulfur from the melt (of the scrubbing stage) were extracted and reduced, using natural gas. The data of the two stages, described herein, is also presented in FIG. 5.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for removing sulfur dioxide from flue gas, said method comprises:
    providing a flue gas comprising a sulfur dioxide;
    absorbing said sulfur dioxide with molten carbonate forming a molten mixture of carbonates sulfites and sulfates at a temperature of between 400° C. to 600° C.;
    treating said molten mixture with a natural gas and optionally with an oxidant, by passing said natural gas through said molten mixture, thereby producing a sulfur containing vapor,
    cooling said sulfur containing vapor and collecting it.

2. The method of claim 1, wherein said step of forming molten mixture of carbonates comprises: melting eutectic mixture of Li, Na, K or combination thereof with said flue gas.

3. The method of claim 1, wherein said oxidant is $O_2$, air, oxygen enriched air.

4. The method of claim 1, wherein said sulfur containing vapor is $H_2S$, $SO_2$, $SO_3$.

5. The method of claim 3, wherein said sulfur containing vapor is further converted to solid or liquid sulfur containing material for further use.

6. The method of claim 1, wherein said treating said molten mixture with a natural gas comprises; heating said molten to a temperature of between 400° C. to 1000° C.

7. The method of claim 1, wherein said natural gas comprises methane, ethane, propane, butane, pentane, acetylene, nitrogen or combination thereof.

8. The method of claim 1, wherein said molten mixture of carbonates, sulfites and sulfates is treated with natural gas and optionally with an oxidant simultaneously.

9. The method of claim 1, wherein said molten mixture of carbonates, sulfites and sulfates is treated with said natural gas first followed by the treatment of said oxidant.

10. The method of claim 1, wherein 0.01-0.5 m³ of natural gas per 1 kg of sulfates or sulfites are passed through the molten mixture.

11. The method of claim 1, wherein said absorbing step is conducted by stirring under flow of bubbling gas.

12. The method of claim 1, wherein said absorbing step and treating step are conducted in two different zones; wherein said first zone comprises a scrubbing chamber for the absorbing step and said second zone comprises a regeneration chamber for the treating step and said zones are connected via hydraulic communication.

13. The method of claim 12 wherein the scrubbing chamber being configured for scrubbing the flue gas by absorbing the sulfur dioxide in a pool to form a molten mixture of carbonates, sulfites and sulfates in the pool.

14. The method of claim 12, wherein the regeneration chamber being configured for producing a sulfur-containing vapor; and comprising a sulfur-containing vapor outlet port configured for controllable release of the sulfur-containing vapor obtained therein.

15. The method of claim 13, wherein said scrubbing chamber comprises a plurality of baffles arranged within said scrubbing chamber and configured to provide a flow of said flue gas within the scrubbing zone.

16. The method of claim 1, wherein said absorbing step and treating step are conducted in one zone; wherein said one zone acts as a scrubbing chamber for the absorbing step and as a regeneration chamber for the treating step.

17. The method of claim 16 wherein the scrubbing chamber being configured for scrubbing the flue gas by absorbing the sulfur dioxide in a pool to form a molten mixture of carbonates, sulfites and sulfates in the pool.

18. The method of claim 16, wherein the regeneration chamber being configured for producing a sulfur-containing vapor; and comprising a sulfur-containing vapor outlet port configured for controllable release of the sulfur-containing vapor obtained therein.

19. The method of claim 16, wherein said scrubbing chamber comprises a plurality of baffles arranged within said scrubbing chamber and configured to provide a flow of said flue gas within the scrubbing zone.

* * * * *